United States Patent
Toro

(10) Patent No.: US 12,222,162 B2
(45) Date of Patent: Feb. 11, 2025

(54) APPARATUS AND BURNER FOR THE FIRING OF CERAMIC ARTICLES

(71) Applicant: SACMI FORNI & FILTER S.P.A., Imola (IT)

(72) Inventor: Alberto Toro, Imola (IT)

(73) Assignee: SACMI FORNI & FILTER S.P.A., Imola (IT)

( * ) Notice: Subject to any disclaimer, the term of this patent is extended or adjusted under 35 U.S.C. 154(b) by 498 days.

(21) Appl. No.: 17/436,946

(22) PCT Filed: Mar. 11, 2020

(86) PCT No.: PCT/IB2020/052156
§ 371 (c)(1),
(2) Date: Sep. 7, 2021

(87) PCT Pub. No.: WO2020/183390
PCT Pub. Date: Sep. 17, 2020

(65) Prior Publication Data
US 2022/0155014 A1 May 19, 2022

(30) Foreign Application Priority Data
Mar. 11, 2019 (IT) ........................ 102019000003481

(51) Int. Cl.
*F27B 9/36* (2006.01)
*F23D 14/70* (2006.01)

(52) U.S. Cl.
CPC ................ *F27B 9/36* (2013.01); *F23D 14/70* (2013.01)

(58) Field of Classification Search
CPC . F27B 9/36; F23D 14/70; F23D 14/10; F23D 14/22
(Continued)

(56) References Cited

U.S. PATENT DOCUMENTS 3,883,621 A * 5/1975 Hammerschmied ... F02M 29/04
261/DIG. 39
4,154,576 A * 5/1979 Bossetti ................... F27B 9/025
432/128

(Continued)

FOREIGN PATENT DOCUMENTS

DE 4014693 11/1991
EP 2255142 A1 12/2010
(Continued)

OTHER PUBLICATIONS

Intention to grant received for European Patent Application No. 20713383.6, mailed on Nov. 15, 2023, 7 pages.
(Continued)

*Primary Examiner* — Avinash A Savani
(74) *Attorney, Agent, or Firm* — Workman Nydegger

(57) ABSTRACT

An industrial apparatus for the firing of ceramic articles; the apparatus comprises a tunnel kiln provided with at least one side wall, a firing chamber and a transport system configured to convey a plurality of ceramic articles along a conveying path; the apparatus comprises at least one burner, which is provided with a first tubular discharge element, a second tubular discharge element and a suction element for the gases present in the firing chamber; the suction element is arranged between the first tubular discharge element and the second tubular discharge element inside the firing chamber.

14 Claims, 6 Drawing Sheets

(58) Field of Classification Search
USPC .......................................................... 431/252
See application file for complete search history.

(56) References Cited

U.S. PATENT DOCUMENTS

| | | | | |
|---|---|---|---|---|
| 4,181,491 | A * | 1/1980 | Hovis | F23D 14/20 |
| | | | | 431/351 |
| 5,092,760 | A * | 3/1992 | Brown | F23D 11/36 |
| | | | | 239/132.5 |
| 5,100,313 | A * | 3/1992 | Anderson | F23D 14/20 |
| | | | | 431/159 |
| 5,934,206 | A | 8/1999 | Saxon et al. | |
| 6,233,974 | B1 * | 5/2001 | Anderson | F23D 14/32 |
| | | | | 65/346 |
| 10,234,136 | B2 * | 3/2019 | Dell | F23C 7/004 |
| 2005/0239005 | A1 * | 10/2005 | Lugnet | F23C 9/006 |
| | | | | 431/116 |
| 2017/0211807 | A1 * | 7/2017 | Graichen | F23R 3/283 |
| 2018/0010588 | A1 * | 1/2018 | Ohta | F04B 9/1053 |
| 2021/0404652 | A1 * | 12/2021 | Upadhye | B22F 10/85 |

FOREIGN PATENT DOCUMENTS

| | | |
|---|---|---|
| EP | 3155320 | 7/2018 |
| WO | 2009/118633 A1 | 10/2009 |

OTHER PUBLICATIONS

International Search Report and Written Opinion for PCT/IB2020/052156 mailed Apr. 28, 2020.
Office Action received for Indian Patent Application No. 202117041087, mailed on Mar. 4, 2022, 6 pages.
International Preliminary Report on Patentability received for PCT Patent Application No. PCT/IB2020/052156, mailed on Sep. 23, 2021, 7 pages.

* cited by examiner

APPARATUS AND BURNER FOR THE FIRING OF CERAMIC ARTICLES

CROSS-REFERENCE TO RELATED APPLICATIONS

This Patent Application is a 371 US Nationalization of International Patent Application No. PCT/IB2020/052156, filed Mar. 11, 2020, which claims priority from Italian Patent Application No. 102019000003481, filed on Mar. 11, 2019, the entire disclosures of which are incorporated herein by reference.

TECHNICAL FIELD

The invention relates to an apparatus and a burner for the firing of ceramic articles. In particular, the invention finds advantageous, though non-exclusive application in the firing of ceramic articles to obtain tiles, to which explicit reference will be made in the description below without because of this loosing in generality.

CONTEXT OF THE INVENTION

The firing of ceramic articles to obtain tiles generally takes place in tunnel kilns, which are delimited by two opposite walls and by a roof. These kilns are usually heated by two series of burners, each arranged on one side of the tunnel.

The burners, which operate with methane, are typically placed on the side walls of the tunnel on different levels and face the opposite wall.

The ceramic article firing cycle is designed with great precision and entails: heating the ceramic articles starting from the input of the kiln, having them remain inside the firing chamber at a predefined temperature, and cooling them in a controlled manner before they reach the output of the kiln.

The ceramic articles are usually transported on a large-sized conveyor consisting of a series of ceramic rollers. As a consequence, it is important to make sure that the temperature inside the firing chamber is uniform along the entire width of the kiln.

To this aim, different types of industrial burners were developed, as well as different arrangements of the burners inside complex apparatuses, so as to obtain a more and more constant temperature inside the firing chamber.

However, especially in very large tunnel kilns, there generally is a non-homogeneous distribution of the temperature in the different longitudinal sections, thus having higher temperatures at the centre of the tunnel and lower temperatures close to the side walls.

This lack of temperature homogeneity inevitably leads to firing defects in the ceramic articles moving close to the walls of the tunnel. In particular, said defects can be both dimensional defects and shape defects, such as the lack of planarity. As a consequence, production waste increases.

This difference between the centre of the kiln and the areas close to the side walls is usually due to the fact that the fumes circulating inside the firing chamber slow down close to the walls, thus decreasing the turbulence of the motion of said fumes and, consequently, also the heat exchange coefficient.

The document DE 4014693 discloses a tunnel furnace, of the type used in the ceramic industry has a burner mounted in the wall of the combustion chamber. The burner is supplied with fuel through a pipe which is fitted with a control valve.

The document EP 3155320 discloses a burner for industrial furnace, which can be installed in a furnace comprising one firing chamber, and comprising a main tubular body provided with at least one first port for the inlet of a fuel, with at least one second port for the inlet of combustive agent, and with an end nozzle provided with an outlet mouth facing towards the firing chamber, and elements for triggering combustion of the fuel-combustive agent mixture. The burner also comprises at least one duct adapted to pick up a portion of the gases present within the firing chamber and to convey them at the outlet mouth of the end nozzle.

The document U.S. Pat. No. 5,934,206 discloses an apparatus for practicing a partial oxidation process of synthesis gas generation.

The object of the invention is to provide an apparatus and a burner, which are designed to at least partially overcome the drawbacks of the prior art and, at the same time, are cheap and easy to be manufactured.

SUMMARY

According to the invention, there are provided an apparatus and a burner for the firing of ceramic articles according to the independent claims attached hereto and, preferably, according to any one of the dependent claims directly or indirectly depending on the independent claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein.

DETAILED DESCRIPTION

Figure 1:
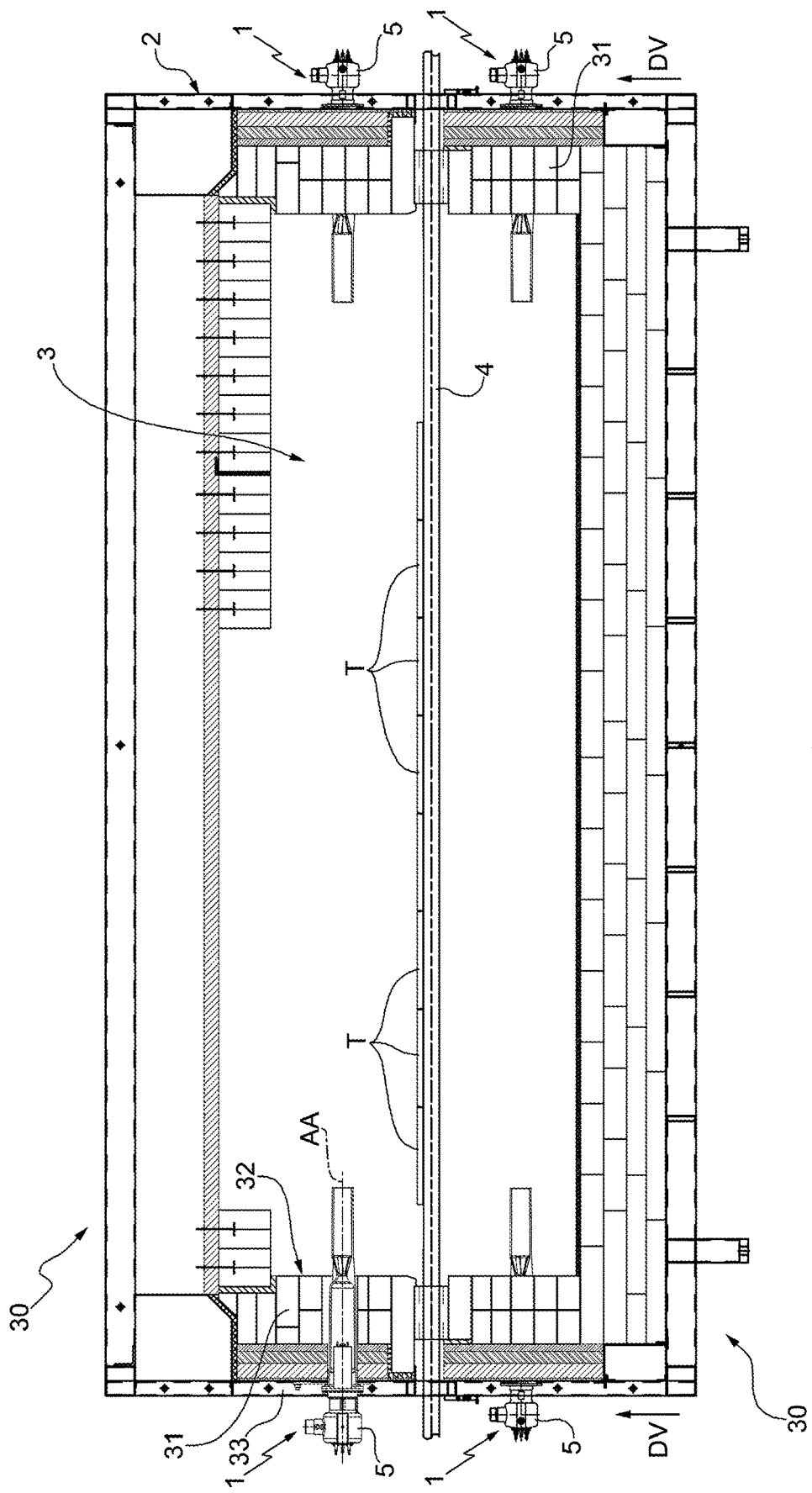
FIG. 1 is a cross-sectional front view of an apparatus according to the invention.

In FIG. 1, number 1 indicates, as a whole, a burner for the firing of ceramic articles T according to a first aspect of the invention.

The burner 1 can be installed in an industrial kiln 2, in particular a tunnel kiln, comprising a firing chamber 3. In particular, according to FIGS. 1 and 2, the ceramic articles T are conveyed by a transport system 4 along a conveying path P.

More precisely, the ceramic articles T are any type of ceramic articles needing at least a kiln firing.

Figure 2:
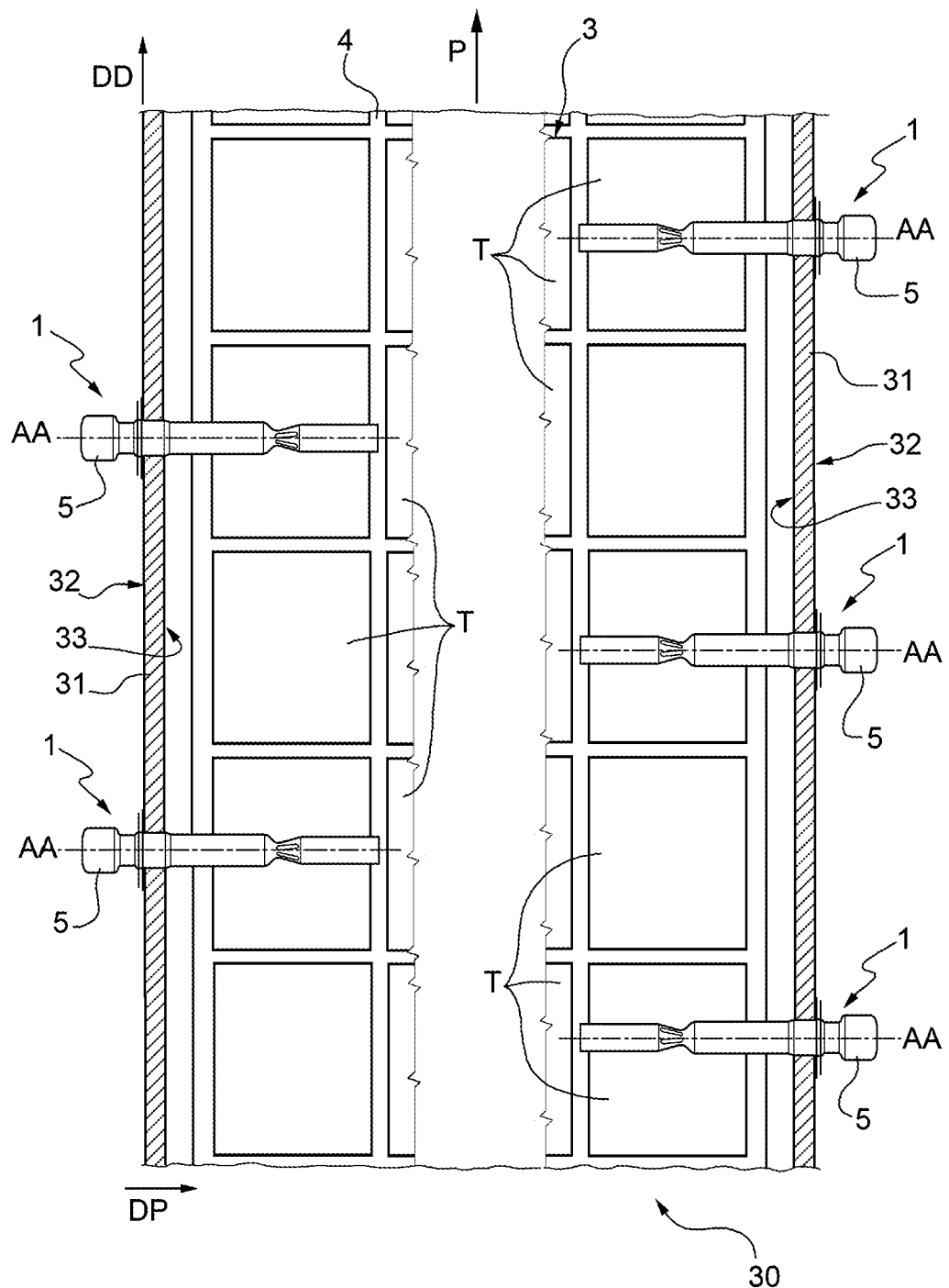
FIG. 2 is a schematic plan view of a segment of the apparatus of FIG. 1.

In the non-limiting embodiment shown in FIGS. 1 and 2, the transport system 4 comprises a series of ceramic rollers, on which the raw ceramic articles T to be fired are placed, preferably in an orderly fashion.

According to some non-limiting embodiments which are not shown herein, the transport system 4 comprises a plurality of ceramic rollers (if necessary, moved at different speeds in order to differentiate the firing of the articles).

Figure 3:
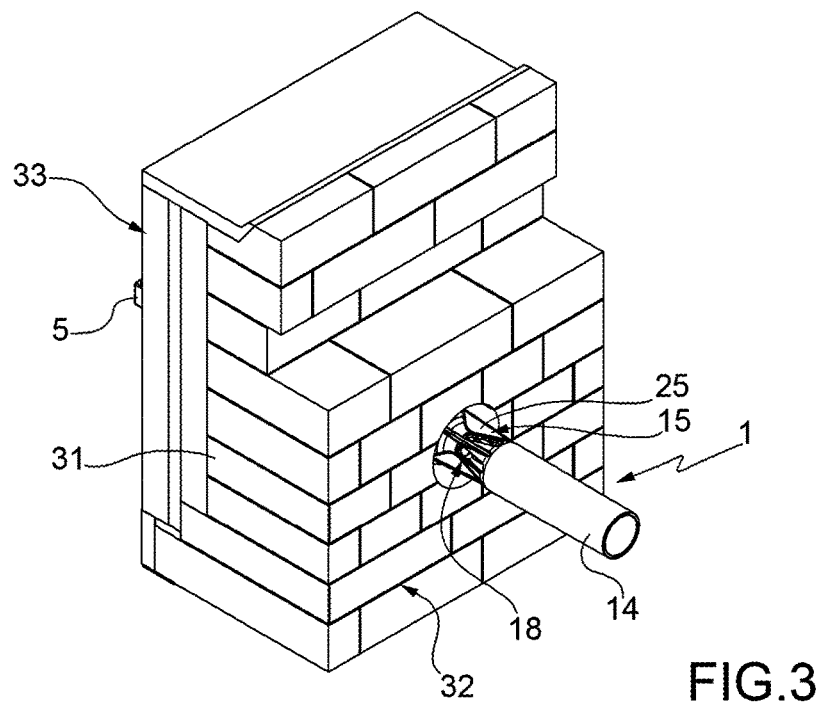
FIG. 3 is a schematic perspective view of part of the apparatus of FIG. 1.
Figure 4:
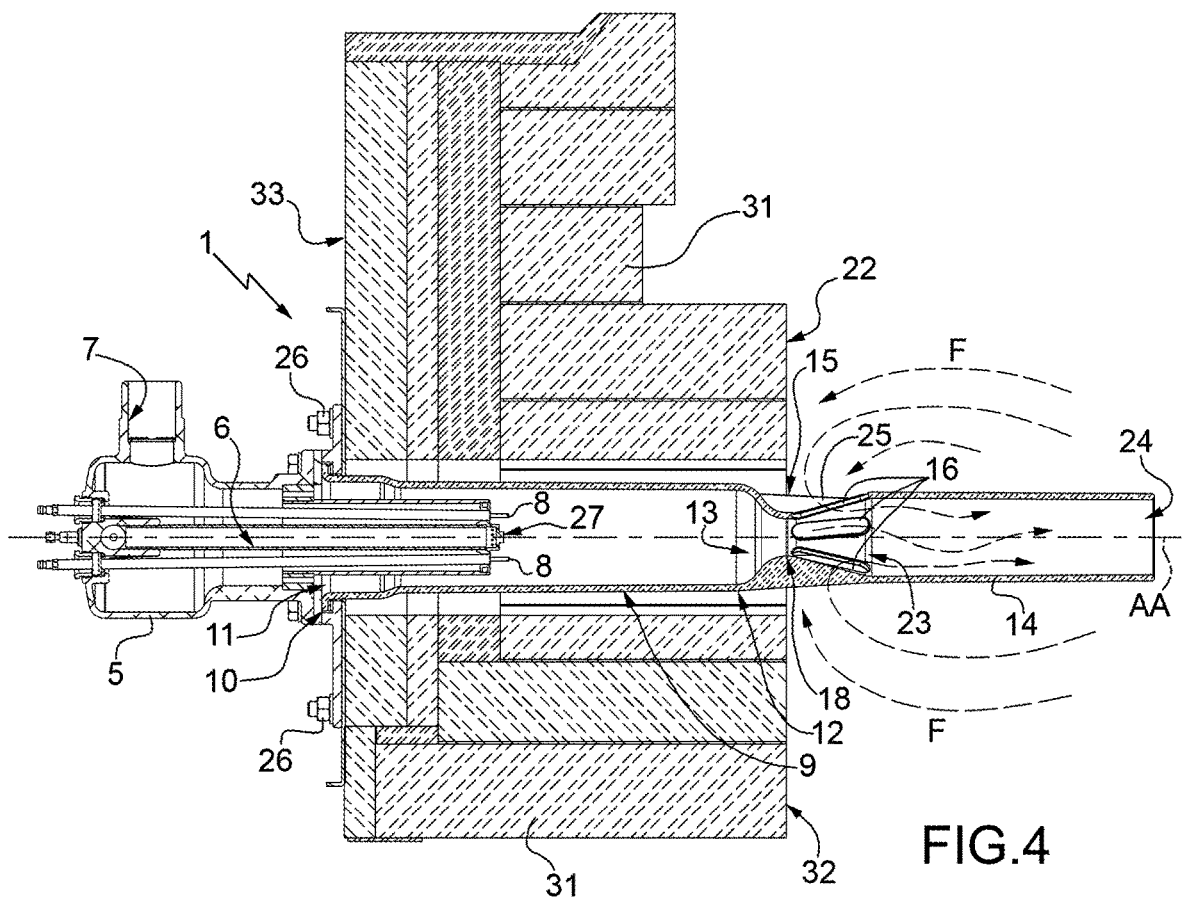
FIG. 4 is a cross-sectional front view of the part of FIG. 3.
Figure 5:
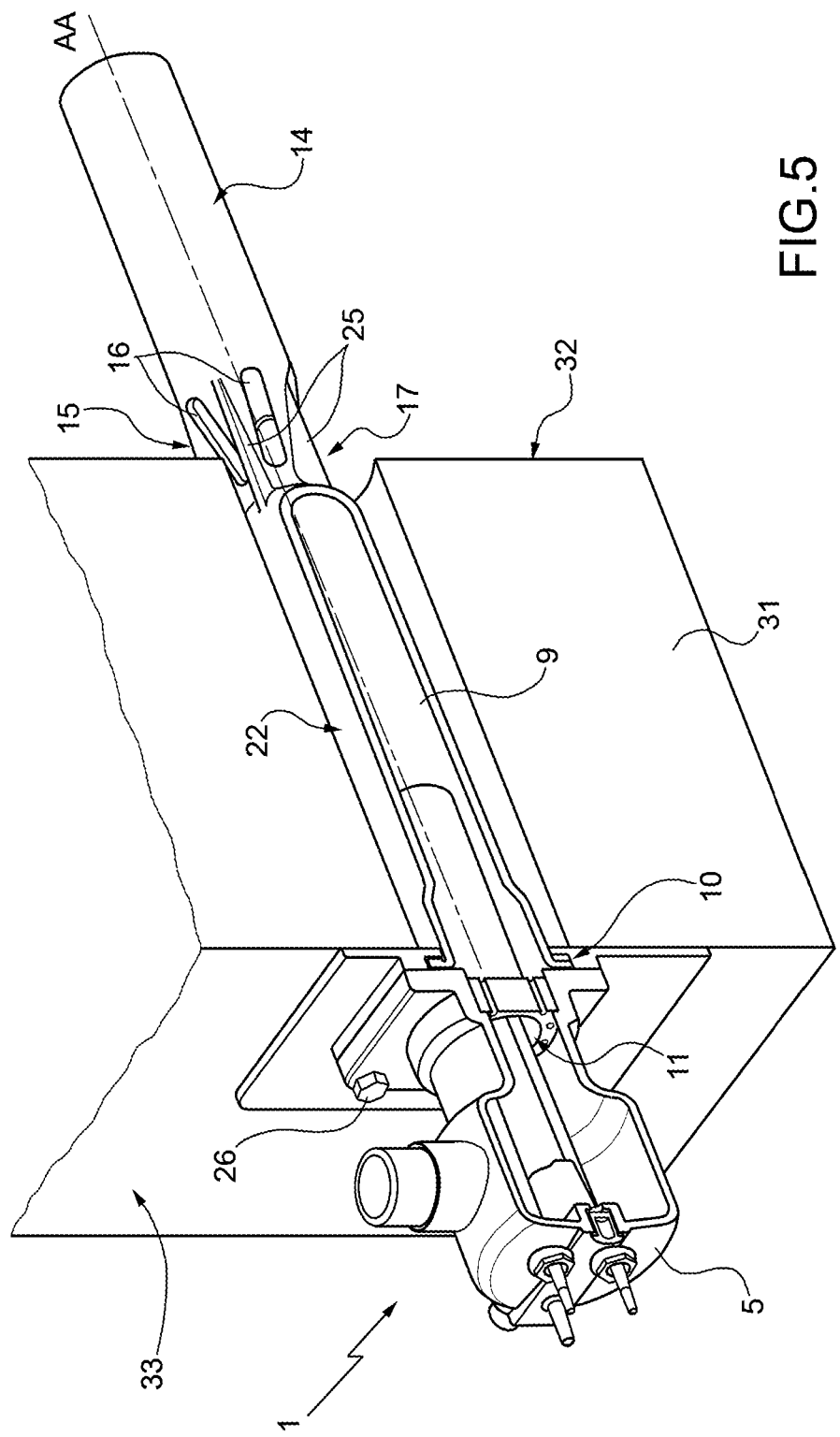
FIG. 5 is a schematic perspective view of the cross section of FIG. 4.

According to FIGS. 3, 4 and 5, the burner 1 comprises a mixing body 5, which, in turn, comprises a fuel feeding duct 6, an oxidizer feeding tank 7, a spark device 8 and a combustion head 27. In other words, the mixing body 5 is the part of the burner that is needed to generate the air-gas mixture which (once it has been ignited in order to obtain a flame) fires the ceramic articles T inside the kiln 2. In particular, the fuel introduced through the fuel feeding duct 6 substantially is methane, whereas the oxidizer introduced through the oxidizer feeding duct 7 substantially is ambient air (with approximately 21% of oxygen).

The burner 1 further comprises a tubular discharge element 9, which is configured to be flown through by a fluid flowing out of the mixing body 5 (consisting of the mixture of fuel and oxidizer and/or a possible combustion thereof) and is provided with an end 10 having an opening 11, into which at least part of the mixing body 5 is inserted, and an end 12, which is opposite the end 10 and has an opening 13.

According to some non-limiting embodiments, the mixing body 5 is coupled to the element 9 through fixing elements. Advantageously, though not necessarily, like in the embodiment shown in FIGS. 4 and 5, the fixing elements are bolts 26.

In the non-limiting embodiment shown in FIGS. 4 and 5, the mixing body 5 is partly inserted into the discharge element 9 and partly arranged on the outside of the kiln 2. In particular, the discharge element 9 is inserted inside a side wall 31 of the tunnel kiln 2. More precisely, the discharge element 9 completely extends inside the side wall 31.

The burner 1 comprises a tubular discharge element 14, which extends from the end 12 of the element 9 in an opposite direction relative to the end 10, namely towards the (more precisely, the inside of the) firing chamber 3. In other words, the discharge element 14 is arranged on the opposite side of the discharge element 9 relative to the mixing body 5.

Furthermore, the burner 1 comprises a suction element 15, which is configured to bring at least part of the gases F present inside the firing chamber 3 to the tubular discharge element 14 and is provided with a plurality of openings 16 arranged between the tubular discharge element 9 and the tubular discharge element 14.

Advantageously, the tubular discharge element 14 is (completely) entirely located inside the firing chamber 3 and, for example, is coaxial to the tubular discharge element 9.

In other words, the longitudinal symmetry axis AA of the tubular discharge element 14 coincides with the longitudinal symmetry axis AA of the tubular discharge element 9.

Figure 6:
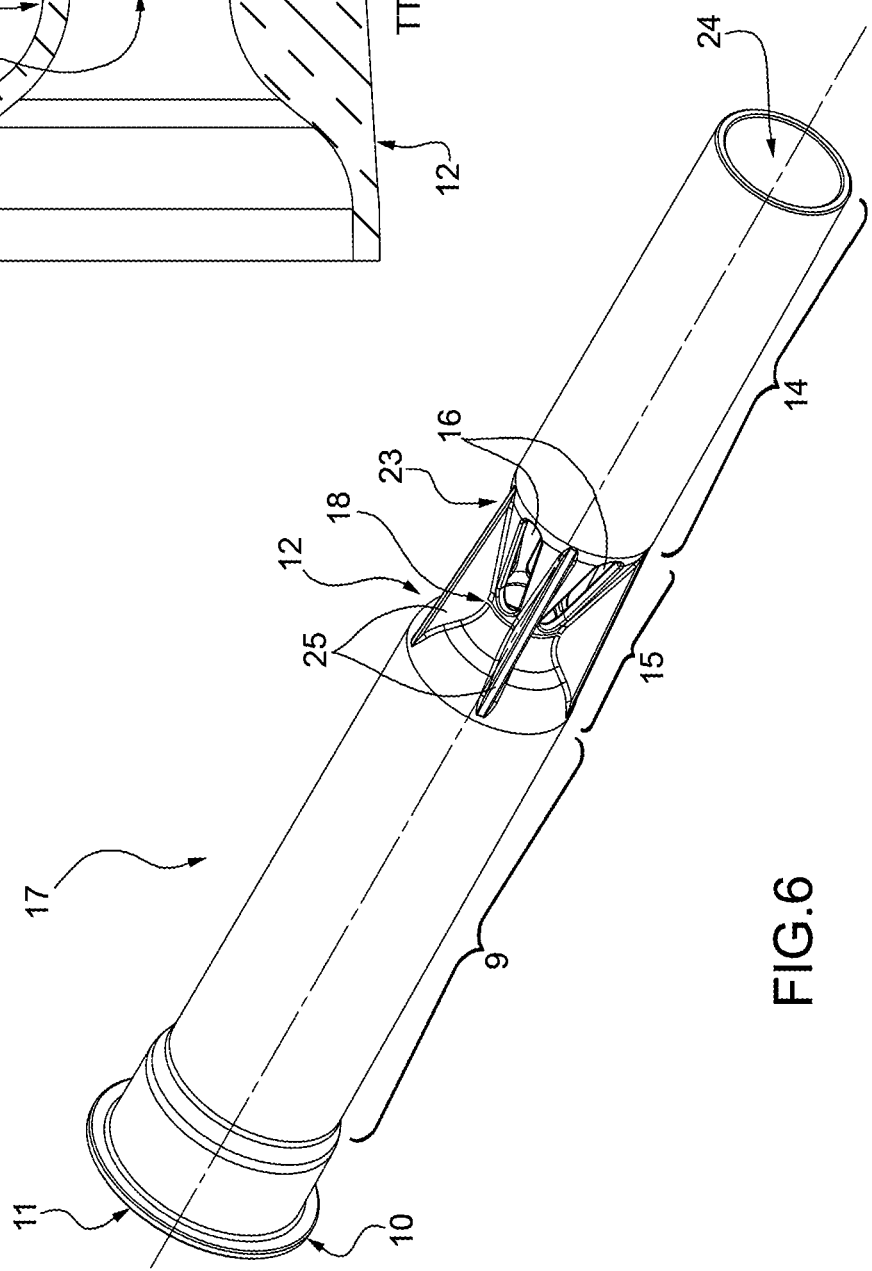
FIG. 6 is a schematic perspective view of part of a burner according to the invention.

In the non-limiting embodiments of FIGS. 4 to 6, the tubular discharge element 9, the tubular discharge element 14 and the suction element 15 form, together, a combustion block 17, which is schematically shown, as a whole, in FIG. 6. In particular, a side surface 22 of the combustion block 17 is (at least) partially without gaps. More in particular, the side surface of the combustion block 17 is without gaps in the sections that are not interrupted by the openings 16.

Advantageously, though not necessarily, the combustion block 17 is manufactured as one single piece, in particular made of silicon carbide. In particular, the longitudinal symmetry axis of the combustion block 17 is the longitudinal symmetry axis AA of the tubular discharge elements 9 and 14.

Advantageously, though not necessarily, the combustion block 17 is obtained through additive manufacturing, in particular 3D printing.

According to some non-limiting embodiments which are not shown herein, the combustion block 17 is obtained by welding the tubular discharge element 9 with the suction element 15 and the suction element 15 with the tubular discharge element 14.

According to other non-limiting embodiments which are not shown herein, the combustion block 17 is obtained by mechanically coupling, by means of fixing systems (e.g. bolts, screws, rivets, etc.), the tubular discharge element 9 to the suction element 15 and the suction element 15 to the tubular discharge element 14.

According to further non-limiting embodiments, the combustion block 17 is obtained by means of die casting techniques.

In the non-limiting embodiments shown in the accompanying figures, the combustion block 17 is hollow and is configured to allow for the passage of a mixture generated by the mixing body 5. In particular, said mixture, once the combustion has been ignited, becomes a flame. According to some non-limiting embodiments, the suction element 15 comprises, in particular is, a Venturi tube.

Figure 7:
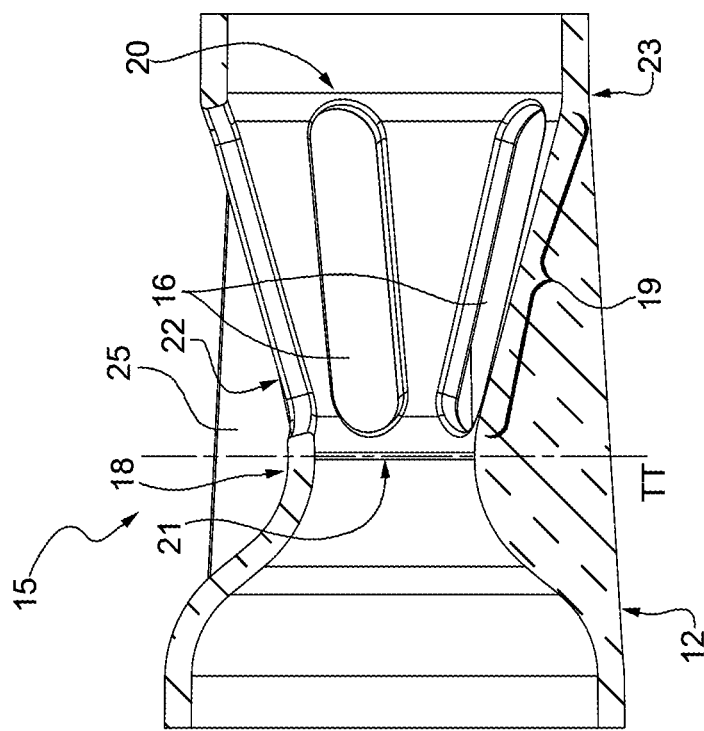
FIG. 7 is a cross-sectional side view of part of the discharge body of FIG. 6.

In the non-limiting embodiment of FIGS. 6 and 7 (wherein FIG. 7 shows a detail of the suction element 15 of the embodiment of FIG. 6), the suction element 15 has a choke 18 arranged in the area of the end 12. Furthermore, the suction element 15 has at least one segment 19 with the shape of a truncated cone, which is delimited by a larger base 20 and a smaller base 21. Finally, the tubular discharge element 14 has an open end 23 facing the suction element 15 and a second open end 24 facing the centre of the firing chamber 3.

Advantageously, though not necessarily, the openings 16 are obtained in the segment 19 with the shape of a truncated cone of the suction element 15. In particular, they (transversely) go through the segment 19 with the shape of a truncated cone of the suction element 15 from side to side.

Advantageously, though not necessarily, the openings 16 are at least partially (in particular, totally) arranged inside the firing chamber 3.

Advantageously, though not necessarily, the openings 16 have an oblong shape, namely are slits, and (transversely) go through the segment 19 with the shape of a truncated cone of the suction element 15 from side to side. In particular, the openings 16 are obtained longitudinally to the tubular discharge element 9 and to the tubular discharge element 14.

More in particular, the smaller base 21 of the segment 19 with the shape of a truncated cone coincides with the choke 18, the larger base 20 of said segment 19 with the shape of a truncated cone coincides with the open end 23.

Advantageously, though not necessarily, and according to FIGS. 3 to 7, the suction element 15 comprises reinforcement ribs 25. Thanks to these ribs 25, the discharge element 14 can be extended as much as desired without risking that the combustion block 17 might break in the area of the segment with the smallest cross section, namely in the area of the suction element 15.

Advantageously, though not necessarily, the discharge element 9 has a circular cross section, in particular with a constant diameter.

Advantageously, though not necessarily, the discharge element 14 has a circular cross section, in particular with a constant diameter.

Advantageously, though not necessarily, the suction element 15 has a circular cross section.

Advantageously, though not necessarily, the suction element 15 has a circular cross section with a substantially variable diameter.

In particular, the cross section TT (FIG. 7) of the choke 18 has a diameter which is smaller than two thirds of the diameter of the discharge element 14 and of the diameter of the discharge element 9. More in particular, the cross section TT (FIG. 7) of the choke 18 has a diameter which is smaller than half the diameter of the discharge element 14 and the diameter of the discharge element 9.

Advantageously, though not necessarily, the cross section TT (FIG. 7) of the choke 18 has a diameter which is smaller than one third of the diameter of the discharge element 14 and of the diameter of the discharge element 9. In particular, the cross section TT (FIG. 7) of the choke 18 has a diameter which is greater than one sixth of the diameter of the discharge element 14 and of the diameter of the discharge element 9.

The more the diameter of the choke decreases, relative to the diameter of the discharge element 9, the more the change in the speed of the mixture circulating, in use, inside the discharge element 9 increases.

Advantageously, though not necessarily, the diameter of the choke 18 ranges from 10 mm (in particular, from 20 mm; more in particular, from 25 mm) to 60 mm (in particular, to 40 mm; more in particular to 35 mm).

Advantageously, though not necessarily, the diameter of the discharge element 14 and the diameter of the discharge element 9 range from 20 mm (in particular, from 40 mm; more in particular, from 50 mm) to 200 mm (in particular, to 120 mm; more in particular to 100 mm).

According to a second aspect of the invention, there is also provided an industrial plant for the firing of ceramic articles.

With particular reference to FIGS. 1 and 2, an industrial apparatus according to the invention is indicated, as a whole, with number 30.

According to some non-limiting embodiments, the ceramic articles T are, after having been fired, tiles. In particular, the ceramic articles T are raw when they enter the apparatus and fired when they come out.

The industrial apparatus 30 comprises a kiln 2, in particular a tunnel kiln, provided with at least one side wall 31, which delimits a firing chamber 3 and has an inner surface 32 on the inside of the firing chamber 3 and an outer surface 33 on the outside of the firing chamber 3.

The industrial apparatus 30 further comprises a transport system 4, in particular a horizontal transport system, which is configured to move a plurality of ceramic articles T along a conveying path P inside the firing chamber 3 (from the input to the output of the firing chamber 3).

The transport system 4 can be any type of transport system. For example, in the non-limiting embodiment shown in FIG. 1, the transport system comprises a series of ceramic rollers, on which the raw ceramic articles T to be fired are placed, preferably in an orderly fashion.

In particular, the tunnel kiln 2 has two opposite side walls 31, between which the ceramic articles T move.

According to some non-limiting embodiments which are not shown herein, the ceramic articles can be any type of ceramic article needing at least a kiln firing.

According to some non-limiting embodiments which are not shown herein, the transport system 4 comprises a plurality of ceramic rollers (if necessary, moved at different speeds in order to differentiate the firing of the articles).

The apparatus 30 comprises a burner 1, which, in turn, comprises a tubular discharge element 9, a tubular discharge element 14 and a suction element 15 for gases F.

Advantageously, though not necessarily, the apparatus 30 comprises a burner 1 according to the description above.

Advantageously, the suction element 15 is placed between the discharge element 9 and the discharge element 14 and is at least partially (in some non-limiting cases, even totally) arranged inside the firing chamber 3.

The suction element 15 is configured to bring at least part of the gases F present inside the firing chamber 3 to the discharge element 14. In this way, it is possible to use the oxygen left inside the firing chamber 3 and complete the combustion of those gases F that were not completely burnt with a first passage inside the burner 1, namely with a primary combustion. Furthermore, the gases F (presumably, even in consideration of the fact that they have a relatively high temperature) help improve the efficiency of the combustion.

By "primary combustion" we mean the combustion generated by the combustion block 17, whose flame crosses the discharge element 9.

Advantageously, though not necessarily, the suction element 15 is arranged in the area of the inner surface 32 of one of the side walls 31. This element 15 is configured to create a depression between the discharge element 9 and the discharge element 14 so as to bring at least part of the gases F present in the firing chamber 3 to the discharge element 10. In particular, in the non-limiting embodiments shown in the accompanying figures, the depression is generated through Venturi effect.

According to a non-limiting embodiment of the invention, which is shown in FIG. 2, the apparatus 30 comprises a plurality of burners 1 arranged in series along a direction DD, which is parallel to the conveying path P.

In the non-limiting embodiments of FIGS. 1 to 5, the burner 1 is coupled, by means of fixing elements, to the wall 31 of the kiln 2. In particular, the discharge element 9 is inserted inside the side wall 31.

In the non-limiting embodiment of FIG. 1, the burners 1 are oriented in a direction DP, which is transverse (in particular, perpendicular) to the direction DD (and, hence, to the conveying path P).

In particular, the burners 1 are arranged on different levels inside at least one of the walls 31 of the kiln 2.

Advantageously, though not necessarily, the tubular element 9 of the burner 1 is installed so as to at least partially (in particular, totally and transversely) go through one of the side walls 31 of the kiln 2. In this way, the flame produced by the burner 1 will directly reach the inside of the firing chamber 3 of the kiln 2.

Advantageously, though not necessarily, the tubular discharge element 14 of the burner 1 is coaxial to the tubular discharge element 9 and is substantially completely arranged inside the firing chamber 3.

According to some non-limiting embodiments which are not shown herein, the discharge element 9 of the burner 8 is installed so as to partially project into the firing chamber 3.

According to the non-limiting embodiments shown in the accompanying figures, the burner 8 has a longitudinal axis AA, which is transverse to the conveying path P. In particular, the axis AA is perpendicular to the conveying path P. More in particular, the axis AA is also perpendicular to the side wall 31 of the industrial tunnel kiln 2.

In use, a mixing body 5 generates a burnt mixture, in particular a flame, whose gases flow through the discharge element 9, which introduces them into the suction element 15, which, in turn, conveys them (together with the gases F sucked into the chamber) into the discharge element 14.

The latter introduces the flame into the combustion chamber.

The products of the combustion emitted by the burner 1 are not totally burnt when they go through the discharge element 9 for the first time, but the combustion is increased (completed) thanks to the continuous recirculation of the gases F (present inside the firing chamber 3) through the suction 15 in the discharge element 14.

In other words, the burner 1 generates, through the spark device 8, a primary combustion of the gases introduced by the ducts 6 and 7 (fuel and oxidizer) and a secondary combustion thereof, using the gases F recirculated from the inside of the firing chamber 3, as they were not completely burnt (and, therefore, have residual oxygen), which are sucked by the suction element 15. In particular, the primary combustion takes place inside the discharge element 9 and the secondary combustion takes place inside the discharge element 14.

In particular, the choke 18 of the suction element 15 determines an increase in the speed of the gas emitted by the burner 1 and flowing out of the discharge element 9.

Subsequently, the speed of the gas decreases again due to the flared shape, in particular divergent shape, of the segment 19 with the shape of a truncated cone.

The change in the speed of the gas, making use of the Venturi effect, determines a depression in the area of the openings 16. This depression determines, in turn, the suction of the gases F present inside the chamber 3, thus allowing for a secondary combustion using these gases F (where there still is a moderate percentage of oxygen—approximately 10%).

In the non-limiting embodiments shown in the accompanying figures, the suction element 15 determines an increase in the turbulent motions inside the firing chamber 3. Furthermore, the secondary combustion taking place inside the discharge element 14 determines a further increase in the heat exchange, in particular through irradiation, due to the heating of the discharge element 14. As a consequence, there is an increase in the total heat exchange coefficient to which the ceramic articles T are subjected and a greater temperature homogeneity inside the firing chamber 3.

According to the advantageous non-limiting embodiment shown in FIGS. 4 and 5, the choke 18 of the suction element 15 is arranged in the area of the inner surface 32 of the wall 31 of the kiln 2. This feature allows for a maximization of the suction and of the recirculation of the gases F present close to the inner surface 32 of the wall 31 of the kiln 2, which are the fumes with the smallest turbulence and, hence, with the lowest temperature.

Figure 8:
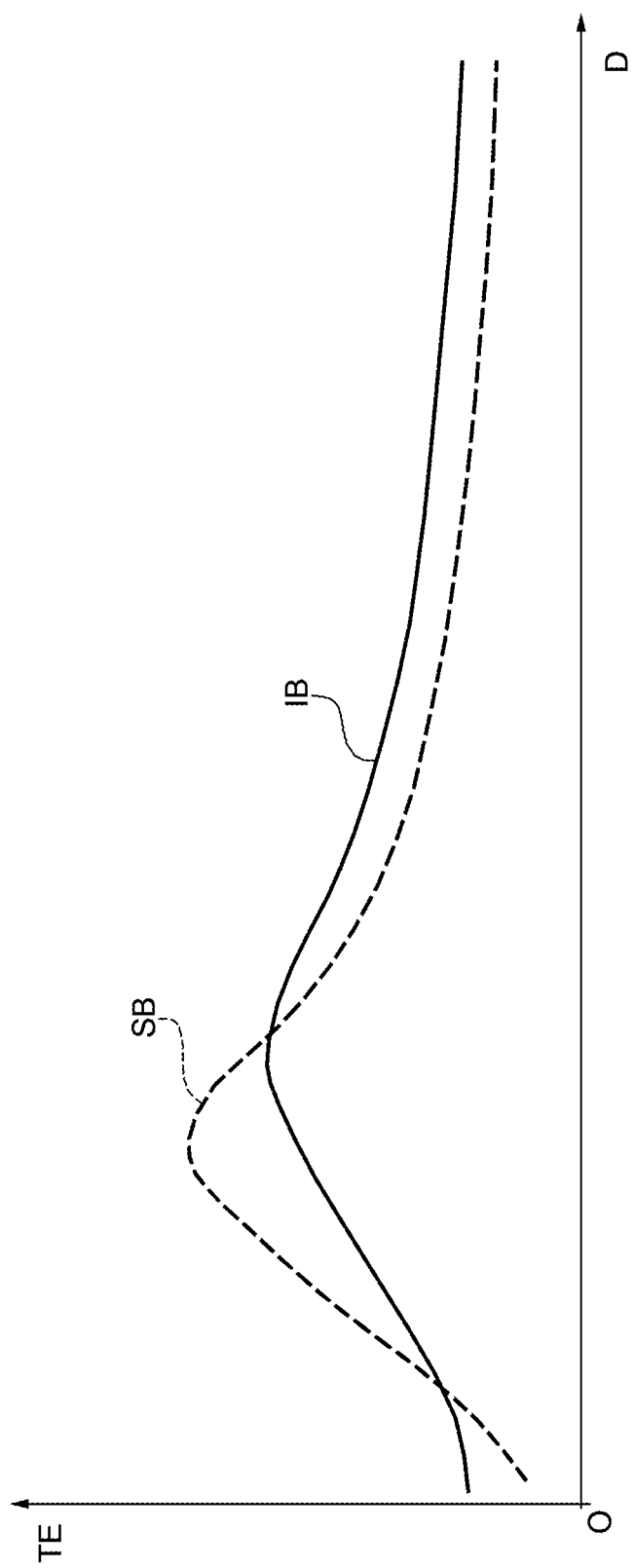
FIG. 8 is a diagram showing the change in temperature depending on the distance from a wall of the kiln (on the abscissa there is the distance, on the ordinate there is the temperature).

The diagram of FIG. 8 shows the development of the temperature depending on the distance from the wall 3 of the kiln 2; the diagram was obtained through experiments.

In particular, the axis of the ordinate indicates the temperature of the ceramic articles T being fired and the axis of the abscissa indicates the distance from the wall 3. The temperature change indicated with the broken line SB is the one of an apparatus with a standard burner, whereas the temperature change indicated with the continuous line IB is the one of a non-limiting embodiment of the apparatus 1 according to the invention.

Therefore, it is evident that, using an apparatus 1 according to the invention, a greater uniformity of the temperature along the width of the firing chamber 3 of the kiln 2 can be obtained. In particular, the temperature close to the all 3 significantly increases thanks to the turbulences generated by the suction element 15 and to the contribution of the irradiation given by the discharge element 14 close to said wall 3; on the other hand, the temperature at the centre of the kiln is higher compared to the traditional case because of the use of the discharge element 14, which allows the combustion block 17 to reach great depths inside the kiln 2. Therefore, the flame coming out of said discharge element 14 is emitted at a greater depth compared to traditional solutions.

It should be pointed out that the temperature peak close to the discharge of the burner 1 is (at least partially) flattened.

Even though the invention described above makes particular reference to a precise example, it is not limited to said example, since its scope of protection extends to all those variants, changes or simplifications covered by the appended claims, such as for example a different geometry of the combustion head 27, of the combustion block 17 and, in particular, of the suction element 15, a different method for sucking the gases F close to the wall 3, a different arrangement of the burners 8 inside the apparatus 1 (both in terms of position and in terms of alignment), a different transport system 4, etc.

The apparatus and the burner described above have many advantages.

First of all, the way in which the burner 1 is manufactured and assembled is simpler compared to prior art solutions comprising more components.

In addition, the burner 1, given the geometry and the penetration in the firing chamber 3, can easily be installed as a replacement (improvement) of a standard architecture.

Furthermore, the presence of the discharge element 14 inside the chamber 3 and of the suction element 15 close to the inner surface 32 of the wall 31 and not inside the wall 31 avoids problems linked to the overheating of the wall 31 itself, usually made of masonry, which would cause an overheating, with possible breaking, of the combustion block 17 and/or the overeating of the mixing body 5 (usually made of metal), which, in turn, would generate a risk of burning for operators and a significant dispersion of energy. Moreover, there are no problems resulting from the formation of deposits and from obstructions caused by possible condensates of gases recirculated inside the masonry of the side wall 31.

Finally, the decrease in dispersions, the increase in combustion (the recirculation obtained, of at least 50% of the fumes, allows for the use of adjustments with reduction of the oxidizer, exploiting the residual oxygen present in the recirculated gases F) and the increase in the uniformity of the temperature inside the firing chamber 3 determine, for the apparatus 30 and the burner 1 according to the invention, the need for a smaller quantity of gas (usually methane) to be introduced into the burner in order to maintain a given temperature, compared to prior art solutions.

The invention claimed is:

1. A burner for the firing of ceramic articles, which can be installed in an industrial kiln comprising a firing chamber, the burner comprising:
   a mixing body;
   a duct to feed a fuel;

a duct to feed an oxidizer;

a spark device to start a combustion;

a first tubular discharge element, which is configured to be flown through by a fluid flowing out of the mixing body and is provided with a first end, into which at least part of the mixing body is inserted, a second end, which is opposite the first end;

wherein the burner comprises:

a second tubular discharge element, which extends from the second end on the opposite side relative to the first end; and a suction element, which is configured to bring at least part of the gases present inside the firing chamber to the second tubular discharge element and is provided with one or more openings arranged between the first and the second tubular discharge element;

wherein the burner is configured in such a way that the suction element is configured to be at least partially arranged inside the firing chamber;

wherein the suction element has a choke arranged in the area of the second end;

wherein the suction element has at least one segment with the shape of a truncated cone, which is delimited by a larger base and a smaller base; and wherein the second tubular discharge element has a first open end facing the suction element and a second open end facing the inside of the firing chamber, wherein the burner is configured in such a way that the second tubular discharge element is configured to be entirely arranged inside the firing chamber and, is coaxial to the first tubular discharge element, and wherein the first tubular discharge element, the second tubular discharge element and the suction element form a combustion block, which has a side surface at least partially without gaps.

2. The burner according to claim 1, wherein the first tubular discharge element, the second tubular discharge element and the suction element form a combustion block manufactured as one single piece.

3. The burner according to claim 1, wherein the combustion block is obtained through additive manufacturing.

4. The burner according to claim 1, wherein the suction element comprises a Venturi tube.

5. The burner according to claim 1, wherein the openings extend through the suction element; the smaller base of said segment with the shape of a truncated cone coincides with the choke; the larger baser of the said segment with the shape of a truncated cone coincides with the first open end.

6. The burner according to claim 1, wherein the suction element comprises reinforcement ribs.

7. The burner according to claim 1, wherein the diameter of the choke is smaller than two thirds of the diameter of the first tubular discharge element and/or of the second tubular discharge element; wherein the diameter of the choke is smaller than half the diameter of the first tubular discharge element and/or of the second tubular discharge element.

8. The burner according to claim 1, wherein the openings are obtained on the segment with the shape of a truncated cone of the suction element; wherein, they go through the segment with the shape of a truncated cone of the suction element from side to side.

9. An industrial apparatus for the firing of ceramic articles comprising:

a tunnel kiln provided with at least one side wall, which at least partially delimits a firing chamber and has an inner surface on the inside of the firing chamber and an outer surface on the outside of the firing chamber;

a transport system, which is configured to convey a plurality of ceramic articles along a conveying path inside the firing chamber; and at least one burner according to claim 1.

10. The apparatus according to claim 9, wherein the suction element is arranged in the area of the inner surface of the side wall; the suction element is configured to create a depression between the first discharge element and the second discharge element so as to bring at least part of the gases present in the firing chamber to the second discharge element.

11. The apparatus according to claim 9 and comprising a plurality of burners arranged in series along a direction, which is parallel to the conveying path.

12. The apparatus according to claim 9, wherein the first tubular discharge element of said at least one burner at least partially extends through the side wall of the kiln; the second tubular discharge element of the burner being substantially coaxial to the first tubular discharge element and being substantially completely arranged inside the firing chamber.

13. The apparatus according to claim 9, wherein the first tubular discharge element of said at least one burner is installed so as to partially protrude into the firing chamber.

14. The apparatus according to claim 9, wherein said burner has a longitudinal axis which is transverse to the conveying path, for example perpendicular to said wall of the industrial kiln.

* * * * *